US012550860B1

(12) United States Patent
Garimberti et al.

(10) Patent No.: US 12,550,860 B1
(45) Date of Patent: Feb. 17, 2026

(54) MILK METER FOR MEASURING MILK

(71) Applicant: InterPuls S.P.A., Albinea RE (IT)

(72) Inventors: Andrea Garimberti, Albinea RE (IT); Stefano Ferri, Albinea RE (IT)

(73) Assignee: Interpuls S.P.A, Albinea Re (IT)

( * ) Notice: Subject to any disclaimer, the term of this patent is extended or adjusted under 35 U.S.C. 154(b) by 0 days.

(21) Appl. No.: 18/867,331

(22) PCT Filed: May 3, 2023

(86) PCT No.: PCT/EP2023/061727
§ 371 (c)(1),
(2) Date: Nov. 19, 2024

(87) PCT Pub. No.: WO2023/222389
PCT Pub. Date: Nov. 23, 2023

(30) Foreign Application Priority Data

May 20, 2022 (GB) .................................. 2207419

(51) Int. Cl.
*G01F 1/20* (2006.01)
*A01J 5/01* (2006.01)

(52) U.S. Cl.
CPC ........................................ *A01J 5/01* (2013.01)

(58) Field of Classification Search
CPC ............... G01F 1/64; G01F 1/708; A01J 5/01
See application file for complete search history.

(56) References Cited

U.S. PATENT DOCUMENTS

| | | | |
|---|---|---|---|
| 3,829,584 A * | 8/1974 | Seiberling | A23C 9/1508 426/231 |
| 4,391,222 A * | 7/1983 | Icking | A01J 5/01 119/14.08 |
| 4,452,176 A * | 6/1984 | Hoefelmayr | G01F 23/246 119/14.17 |
| 5,116,119 A | 5/1992 | Brayer | |
| 5,746,153 A | 5/1998 | Hoefelmyr | |
| 5,792,964 A | 8/1998 | van den Berg | |
| 6,073,580 A | 6/2000 | Graupner et al. | |

(Continued)

FOREIGN PATENT DOCUMENTS

| CA | 969647 A | 6/1975 |
|---|---|---|
| CA | 2594500 A1 | 8/2006 |

(Continued)

OTHER PUBLICATIONS

International Preliminary Examination Report on Patentability for International Application No. PCT/EP2023/061727, Dated Jan. 26, 2024, 14 pages.

(Continued)

*Primary Examiner* — Tran M. Tran
(74) *Attorney, Agent, or Firm* — Lee & Hayes, P.C.

(57) ABSTRACT

Various embodiments provide a milk meter (100) for measuring milk flow in a milking machine. In an embodiment the milk meter comprises a plurality of ducts (140a, 140b) forming a plurality of flow paths through the milk meter. Also, the milk meter comprises a plurality of flow sensors (142) positioned within the plurality of flow paths. Each flow sensor is operable to measure a flow rate of fluid through its respective flow path. Other types of milk meter are provided in other embodiments.

23 Claims, 16 Drawing Sheets

(56) References Cited

U.S. PATENT DOCUMENTS

| | | | |
|---|---|---|---|
| 6,539,797 B2* | 4/2003 | Livingston | G01F 23/266 73/304 C |
| 6,796,188 B2* | 9/2004 | Bond | G01F 1/007 73/861.04 |
| 6,799,474 B2* | 10/2004 | Brown | A01J 5/007 73/861.15 |
| 8,229,686 B2* | 7/2012 | Rawat | G01F 1/74 73/861.31 |
| 8,250,930 B2* | 8/2012 | Krone | A01J 5/01 73/861.04 |
| 8,342,123 B2* | 1/2013 | Springer | A01J 5/01 119/14.02 |
| 9,222,811 B2* | 12/2015 | Sonnenberg | G01F 1/68 |
| 9,468,191 B2* | 10/2016 | Hoefelmayr | A01J 5/045 |
| 9,470,565 B2* | 10/2016 | Kromwijk | G01F 25/10 |
| 9,719,821 B2* | 8/2017 | Liao | G01F 1/74 |
| 9,927,273 B2* | 3/2018 | Brown | G01F 1/007 |
| 10,724,886 B2* | 7/2020 | Huang | G01F 23/296 |
| 10,815,773 B2* | 10/2020 | Huang | G01F 1/74 |
| 11,317,595 B2* | 5/2022 | Persson | A01J 5/01 |
| 11,788,983 B2* | 10/2023 | Parry | G01N 33/2847 175/38 |
| 12,092,501 B2* | 9/2024 | Sabharwall | G01F 15/00 |
| 2002/0148407 A1 | 10/2002 | Brown et al. | |
| 2004/0060373 A1* | 4/2004 | Pharaoh | A01J 5/01 73/863.02 |
| 2005/0034518 A1 | 2/2005 | Wamhof et al. | |
| 2009/0229375 A1 | 9/2009 | Atkinson et al. | |
| 2014/0352453 A1 | 12/2014 | Sonnenberg | |
| 2017/0303496 A1 | 10/2017 | Fematt et al. | |

FOREIGN PATENT DOCUMENTS

| | | |
|---|---|---|
| EP | 0373930 A2 | 6/1990 |
| EP | 0536080 A2 | 4/1993 |
| EP | 0795268 A1 | 9/1997 |
| KR | 1020190050654 A | 5/2019 |
| NL | 1030940 C1 | 7/2007 |
| WO | WO2009070027 A1 | 6/2009 |
| WO | WO2019199223 A1 | 10/2019 |
| WO | WO2020202151 A1 | 10/2020 |

OTHER PUBLICATIONS

Search Report for Great Britain Application No. GB2207419.9, Dated Apr. 28, 2023, 2 pages.
Search Report (1st) for Great Britain Application No. GB2207419.9, Dated May 10, 2023, 3 pages.
Search Report (2nd) for Great Britain Application No. GB2207419.9, Dated May 10, 2023, 2 pages.
Search Report (3rd) for Great Britain Application No. GB2207419.9, Dated May 10, 2023, 3 pages.
Search Report for International Application No. PCT/EP2023/061727, Dated Oct. 20, 2023, 18 pages.

* cited by examiner

MILK METER FOR MEASURING MILK

CROSS-REFERENCE TO RELATED APPLICATIONS

This application is a U.S. National Phase application of International Application No. PCT/EP2023/061727, filed May 3, 2023, which claims priority to Great Britain Application No. GB 2207419.9, filed May 20, 2022, both of which are incorporated herein by reference in their entirety.

FIELD OF THE INVENTION

The present invention relates to a meter for measuring fluid flow, and particularly, although not exclusively, to a milk meter for measuring milk flow in a milking machine or milking apparatus.

BACKGROUND

The topic of precision farming has increased its importance in the last years. At least in part, this is driven by a desire to support the reduction of the environmental impact and to optimize the economical KPI of the farm. To this end, gathering additional data regarding the milk production of the animals owned by a dairy farm in a timely and continuous manner is desirable, as this can enable farm managers to achieve efficient management of dairy herds.

For example, such data may enable farm managers to:
Identify stress or disease in the animal, including potential issues such as inflammation of the breast or udder (which can lead to mastitis) or animal discomfort more generally;
Assess the preparation of the animal performed by the milkers;
Improve the milking process by avoiding over or under milking of animals;
Classify animals based on their milk production, enabling animals with similar milking characteristics (e.g. milk release rate) to be grouped for more efficient milking sessions;
Optimise food and resource provision to animals to avoid over-feeding (leading to excess fattening of the animal) or under-feeding (leading to poor health or reduced milk production) by allocating food and resources based on present or anticipated milk production.

One way that such data can be gathered is through the use of a milk meter. Known types of milk meters include "free-flow" milk meters and "fill and dump" or "double chamber" milk meters. Such milk meters are typically installed along the milk tube of a milking machine, between the milking cluster (which is connected to the teats of the animal) and the reservoir where milk is collected. A milking machine operates by applying a suction or vacuum to the teats of the animal, drawing milk along the milk tube and through the milk meter. In a typical milking parlour, a milk meter is often provided for each milking stall, enabling the milking of each animal to be monitored.

It would be desirable to provide a milk meter which can provide improvements over known configurations to better address the requirements of precision farming.

The present invention has been devised in light of the above considerations.

SUMMARY OF THE INVENTION

According to a first aspect of the invention, there is provided a milk meter comprising a plurality of ducts forming a plurality of flow paths through the milk meter; and a plurality of flow sensors positioned within the plurality of flow paths, each flow sensor being operable to measure a flow rate of fluid through its respective flow path.

Providing a milk meter configured in this way enables improved measurement by the milk meter of the fluid flow rate. For example, providing a plurality of flow paths may provide redundancy in case of restriction or blockage of a flow path. Furthermore, the provision of a sensor in each respective flow path can improve the measurement resolution of the milk meter. This is because, in a milk meter with a plurality of flow paths, only a part of the fluid need pass through any one of the flow paths. Therefore, a sensor operable to measure a flow rate of fluid through its respective flow path can be arranged to apply its full measurement range to only a part of the total flow, enabling more precise measurement of the overall flow rate.

A flow path may be defined or viewed as a continuous route for fluid to flow between an inlet of the milk meter and an outlet of the milk meter. A flow path may include one or more ducts and may pass through one or more junctions where ducts divide or combine. Having a plurality of flow paths can enable the total cross-section of passages or ducts forming the flow paths to be larger, even if each individual cross-section is smaller, which may reduce the effect of the milk meter on the vacuum stability of a connected milking machine.

Optionally, the milk meter may be configured to determine a measured total flow rate of fluid through the milk meter using the measured flow rates from the plurality of flow sensors. The milk meter may determine the measured total flow rate by performing a sum of the measured flow rates from the plurality of flow sensors. The milk meter may determine the measured total flow rate by performing an averaging of the measured flow rates from the plurality of flow sensors. The flow rates from different sensors may be weighted, for example, according to the proportion of flow expected to pass through a particular flow path (for example if the flow paths have different dimensions or cross-sectional areas).

Combining the data from the plurality of sensors in this way further enables improved overall measurement resolution for the milk meter.

The determination of the measured total flow rate may be performed by a computing device that is integral to the milk meter, such as a microcontroller.

Additionally or alternatively, the milk meter may supply data to an external computing device to enable the calculation or processing of data to be carried out. For example, the milk meter may transmit data to the external computing device intermittently or continuously/in real time via a wired or wireless communication channel. Additionally or alternatively, the milk meter may include (or be connectable to) a storage device which can be used to transfer the data from the milk meter to the external computing device.

The external computing device may be a dedicated computing device for processing data from one or more milk meters, or may be a dedicated computing device for controlling one or more milking machines and processing data from one or more milk meters. The external device may be a generic computing device (e.g., a smartphone, tablet, or laptop computer) and may implement the data processing via software.

Data processing may be divided between a computing device integral to the milk meter and an external computing device. For example, an integral computing device may collate and/or smooth data before supplying it to an external computing device for further processing.

The data supplied by the integral computing device of the milk meter or by the external computing device based on data from the milk meter may include a fluid flow rate (e.g. an instantaneous fluid flow rate), and/or a mass, weight, or volume of fluid produced. For example, the integral computing device of the milk meter or the external computing device may integrate the fluid flow with respect to time to determine a volume of fluid produced. This may be converted to a mass or weight of fluid produced using a density value.

Optionally, the milk meter may comprise an inlet for receiving fluid, and the plurality of ducts may divide from and extend downstream from this inlet. Optionally, the milk meter may comprise an outlet for releasing fluid from the milk meter, and the plurality of ducts may combine upstream of the outlet.

Providing a milk meter with a single inlet and/or single outlet where the division and/or combination of ducts occurs within the milk meter can enable the milk meter to be more readily integrated with a milking system, since it can be integrated into the milk pipe of a milking machine without requiring additional connection pipes or other components.

According to a second aspect of the invention, there is provided a milk meter comprising: an inlet for receiving fluid, the inlet having a first cross-sectional area; a chamber downstream of the inlet for receiving fluid from the inlet, the chamber having a second cross-sectional area greater than the first cross-sectional area; one or more ducts extending downstream from the chamber, the ducts having a combined cross-sectional area intermediate to the first and second cross-sectional areas. The first, second, and intermediate cross-sectional areas are selected such that the milk meter is operable to generate stratified flow of fluid within a stratified flow region in each of the one or more ducts. The milk meter further comprises a flow sensor operable to measure a flow rate of fluid through the milk meter.

Stratified flow is a flow regime wherein fluids flow in different layers within a near-horizontal duct or vessel. In the context of this invention, stratified flow refers to a flow regime where liquid (e.g. milk) and air flow in separate layers within the stratified flow region of the duct. Stratified flow is generated through the sequence of expansion and contraction of the fluid as it passes between the various stages of the milk meter. The chamber having a larger cross-section than the inlet enables the fluid to expand on entering the chamber. This slows the fluid flow to reduce turbulence. The one or more ducts having a combined smaller cross-sectional area than the chamber compact the fluid, reducing foam formation. The combination of these two transitions therefore slows and stabilises the flow of the fluid (milk) through the meter, providing favourable conditions for the generation of stratified flow. As the fluid moves down the duct, the liquid and gas can separate or stratify to provide the stratified flow regime in the stratified flow region of the duct.

Generating a stratified flow regime within a milk meter provides a number of technical advantages to the milk meter. The stratified flow regime provides a lower vacuum drop (wherein the milk meter has an adverse effect on the vacuum or suction level of a system in which it is installed) across the device and an increase of the vacuum stability by reducing the turbulent flow and/or the presence of foam within the milk meter. Furthermore, it can enable more stable flow through or past the sensors of the milk meter, and improved contact between the fluid and the sensors, thereby providing more accurate measurement. For example, there is a reduced need to narrow the passage in the region of the sensor to ensure reliable contact between the fluid and the sensor. Therefore, the effectiveness and utility of the milk meter is improved.

The chamber may be connected to the inlet of the milk meter, and the duct or ducts connected to a chamber of the milk meter. Where a single duct is present, the duct may be connected directly to the outlet of the milk meter. Where multiple ducts are present, the ducts may be connected directly to the outlet of the milk meter, or may recombine in a chamber (e.g., a second chamber) that is connected to the outlet of the milk meter.

Optionally, the milk meter may comprise a flow sensor positioned within each of the one or more ducts, each flow sensor being operable to measure a flow rate of fluid through its respective duct. Additionally, the milk meter may comprise a flow sensor positioned within the stratified flow region of each of the one or more ducts.

Providing a flow sensor in each of the one or more ducts can enable higher resolution measurement of the total flow rate for the reasons discussed above. Providing the flow sensor in the stratified flow region of each of the one or more ducts can further improve the measurement accuracy by enabling the fluid to be measured in a region of stable flow.

Optionally, the milk meter may comprise a plurality of ducts extending downstream from the chamber, and a cross-sectional area of at least one duct may be smaller than the first cross-sectional area.

This configuration is advantageous for generation of a stratified flow regime within the milk meter. Furthermore, where a plurality of ducts is present, the milk meter further realises the advantages discussed above in view of the first aspect.

According to a third aspect of the invention, there is provided a milk meter comprising a flow sensor operable to measure the flow rate of fluid through the milk meter, and a duct for conveying fluid through the milk meter downstream of the flow sensor. The duct has a downward ramp or step to reduce fluid backflow through the sensor.

Changes in pressure within the milking system can cause changes in flow rates and/or counter-pressure waves which can, in some circumstances, lead to reverse or backflow through the milk meter. This backflow can cause errors in measurement by causing fluctuation in flow past the sensor. Reducing this backflow through the use of a downward step or slope can therefore reduce or prevent fluid propagation in a reverse direction along the ducts, providing improved measurement consistency.

Optionally, the duct comprises a first portion and a second portion downstream of the first portion. A flow sensor may be positioned within the first portion of the duct, the flow sensor being operable to measure the flow rate of fluid through the duct. The first portion of the duct may form a first downward gradient (e.g., to promote fluid flow through the milk meter and/or to promote draining of the milk meter after use), and the second portion of the duct may form a second downward gradient, the second downward gradient being steeper than the first downward gradient so as to form the downward step or slope of the duct. In this context, a steeper downward gradient is defined as a gradient that is a greater angle below a horizontal axis. That is, the first portion may be physically arranged so as to extend at the first downward gradient and in so doing define a flow path to convey fluid at the first downward gradient. By analogy, the second portion may be physically arranged so as to extend at the second downward gradient and in so doing define a flow path to convey fluid at the second downward gradient.

The duct may further comprise a third portion downstream of the second portion and having a third downward gradient shallower than the second downward gradient (for example, substantially equal to the first downward gradient). In this context, a shallower downward gradient is defined as a gradient that is a smaller angle below a horizontal axis. In this way, an overall consistent gradient can be provided within the milk meter, while still attaining the benefits provided by the downward step or slope.

Optionally, the milk meter is configured to be used or operated at a particular orientation, such that the duct is angled to have a particular first and second downward gradient. The milk meter may include or be usable with a mounting bracket by which the milk meter may be mounted to an external surface and angled to have a set gradient. The bracket may be detachable from the milk meter such that the milk meter can be removed from the mounting while leaving the bracket in place. The bracket may hold the milk meter at a fixed angle, and/or may be adjustable to enable the milk meter to be oriented as required (e.g., the angle may be adjustable via an adjustment mechanism of the bracket). In either case, the bracket may enable the milk meter to be removed and remounted without the requirement to reset the angle (in other words, the bracket may hold the milk meter at a fixed angle relative to itself).

Optionally, the first downward gradient is between 5° and 25° from or below horizontal, preferably between 10° and 20°, more preferably 15°. A gradient in this range ensures optimal operation of the milk meter. A shallower gradient can lead to milk or fluid pooling in the device rather than being fully discharged, in particular in the case of a reduction or removal of the vacuum. A steeper gradient may cause the milk or fluid to flow too quickly and unevenly through the meter (in a turbulent manner, for example). The second gradient may be more than 5° steeper than the first gradient, preferably more than 10° steeper than the first gradient, more preferably more than 20° steeper than the first gradient, or more than 30° steeper than the first gradient.

According to a fourth aspect of the invention, there is provided a milk meter comprising a duct for conveying fluid through the milk meter; a conductivity sensor arranged to measure a conductivity of the fluid; and a flow sensor positioned within the duct and being arranged to measure a resistance between two points along the duct to measure a flow rate of the fluid through the duct. The milk meter is configured to calibrate the measured flow rate from the flow sensor based on the measured conductivity. As in the first aspect, this functionality may be performed by an integral computing device, an external computing device, or a combination of an integral computing device and an external computing device.

The calibration may be continuous, or may involve intermittent sampling of the fluid conductivity and subsequent calibration of the measured flow rate. For example, an algorithm may be employed that enables a correction factor to be calculated for the measured flow rate based on the measured conductivity.

Conductivity of milk can vary both during the milking process, as well as between different animals and different species of animal. Since the flow rate can be measured based on an electrical resistance through the milk, changes in the conductivity of the milk may cause a drift or offset in the measured flow rate. Therefore, it is advantageous to calibrate the flow rate by independently measuring the conductivity of the fluid (milk). This can provide greater accuracy in the measurement by enabling the milk meter to correct for variations in the conductivity of the fluid.

The flow sensor may comprise a pair of electrodes arranged to measure a resistance between two points along the duct. When a depth of fluid in the duct (corresponding to a volume of milk passing through the duct) increases, the volume of fluid through which the resistance is measured increases, and hence the measured resistance decreases. When a depth of fluid in the duct decreases, the volume of fluid through which the resistance is measured decreases, and hence the measured resistance increases. Therefore, the flow rate can be determined based on the measured resistance.

The conductivity sensor may comprise a pair of electrodes and may determine a conductivity of the fluid by measuring a resistance between the two electrodes. The electrodes may be arranged to be in a region of reduced or zero flow (e.g. a stagnant region) of the milk meter and may thereby be arranged to measure a resistance through a substantially fixed or static volume of fluid. This can therefore provide a conductivity reading that is independent of flow rate.

The milk meter may further comprise a pressure sensor to measure an air pressure within the milk meter. The milk meter may be configured to calibrate the measured flow rate from the flow sensor based on the measured conductivity and on the measured air pressure.

A change in the measured air pressure within the milk meter may indicate that excess air is being drawn through the milking system (for example due to a milk liner slipping on or from a teat of the animal). This may affect the measured conductivity or flow, for example by introducing excess foam within the milk meter. A milk meter that includes a pressure sensor can therefore be configured to correct for such deviations. For example, an algorithm may be employed that enables a correction factor to be calculated for the measured flow rate based on the measured air pressure and the measured conductivity.

According to a fifth aspect of the invention, there is provided a milk meter comprising a duct for conveying fluid through the milk meter; a flow sensor operable to measure the flow rate of fluid through the milk meter; and a pressure sensor to measure an air pressure within the milk meter.

Providing a milk meter with a pressure sensor may enable detection and correction of the operation of the milking system (for example if one or more of the milk liners is slipping from an animal teat). Monitoring pressure or vacuum levels can also be used to improve animal comfort by optimising the suction pressure within the system.

Optionally, the pressure sensor may be arranged to measure the air pressure within the duct.

This can provide simple and direct measurement of the air pressure within the milk meter and its ducts.

Optionally, the pressure sensor may be arranged to measure the air pressure in a chamber fluidly connected to the duct, the chamber being isolated from the duct by a shield. The shield may be configured to allow air to pass between the chamber and the duct to enable an air pressure to equalise between the duct and the chamber, but which reduces or prevents the passage of milk vapour, foam or splashed milk from the duct entering the chamber.

For example, a shield may include one or more baffles which partially block the passage between the duct and the chamber, thereby forming a tortuous path through which air may pass, but which restricts the passage of liquid, foam, or vapour droplets. A shield may alternatively include a semipermeable membrane (i.e. a porous membrane which permits air to pass through, but which restricts the passage of liquid, foam, or vapour droplets).

This latter arrangement may reduce or prevent milk vapor, foam or splashed milk from entering into the pressure sensor. This is preferable since these could otherwise lead to inaccurate readings from the meter and/or damage to the sensor.

The following features may be included in a milk meter according to any of the first to fifth aspects of this invention.

The milk meter may comprise a V-shaped region in the duct or ducts, wherein the V-shaped region has a base with a V-shaped cross-section.

A V-shaped region at the base of a duct can enable improved measurement, in particular of lower flow levels, since a duct that is narrower at a base will lead to a non-linear increase in fluid depth for a particular fluid volume. In other words, the narrower portion of the base of the duct means that a low flow rate will lead to a greater fluid depth than would otherwise occur. This increased depth may enable low fluid flow rates to be better measured.

Optionally, the milk meter may further comprise a transition region arranged upstream of the V-shaped region, wherein a base portion of the transition region transitions (e.g., gradually transitions) from e.g. a rounded cross-section to the V-shaped cross-section along a length of the transition region.

Optionally, the milk meter may further comprise a transition region arranged downstream of the V-shaped region, wherein a base portion of the transition region transitions (e.g., gradually transitions) from a V-shaped cross-section to e.g., a non-V shaped or rounded cross section along a length of the transition region.

Providing a milk meter with a gradual transition of duct shape may be advantageous in that it does not introduce an additional potential source of turbulence within the milk meter. Therefore, a gradual transition can provide a milk meter with more consistent and uniform fluid flow.

Optionally, the flow sensor of this milk meter may comprise a plurality of electrodes arranged within the V-shaped region of the duct to measure a resistance between two points along the duct. The electrodes may have a V-shaped cross-section commensurate with the V-shaped cross-section of the base portion of the V-shaped region.

Such electrodes are advantageous in that they can further improve the measurement accuracy for low flow rates as discussed above.

Optionally, the milk meter may comprise a stagnation well to generate a region of stagnant fluid; and one or more sensors located to measure a characteristic of the stagnated fluid within the stagnation well.

A stagnation well generates a region of semi-static fluid within the milk meter, with continuous replacement of the fluid that stagnates in the well. This semi-static flow condition can enable improve measurement of the fluid in the stagnation well by avoiding flow past the sensors which might otherwise disrupt the measurement.

Use of a stagnation well enables the generation of a semi-static condition within the milk meter without a requirement to halt or pause the flow through the milk meter (which may therefore provide improved flow stability) and without a requirement for valves or movable mechanical components (which may therefore provide reduced complexity and reduced size for the milk meter).

Optionally, the stagnation well may comprise a concave depression formed in a base of a duct of the milk meter. For example, the concave depression may have a teardrop shape with a narrow upstream portion and a wider bulge towards a downstream end. Such a configuration may be suitable for generating a semi-static flow in the stagnation well.

This provides a particular implementation of a stagnation well.

Optionally the one or more sensors may include at least one of a temperature sensor to measure a temperature of the fluid and a conductivity sensor to measure a conductivity of the fluid.

Such sensors may particularly benefit from measuring in a semi-static flow regime. The measured conductivity and/or milk temperature may be indicative of various aspects of the animal health, enabling monitoring.

Optionally, the one or more sensors includes a temperature sensor to measure a temperature of the fluid, and the milk meter is configured to calibrate the measured flow rate based on the measured temperature. An integral or an external computing device (or a combination thereof) may be used to provide this functionality. For example, an algorithm may be employed that enables a correction factor to be calculated for the measured flow rate based on the measured temperature. As with variations in conductivity, variations in temperature can influence the measurement of flow rate. Measuring the temperature in this way can therefore enable improved calibration of the flow rate measurement, as discussed above in view of the third aspect of the invention.

Optionally, the one or more sensors may include both of a temperature sensor to measure a temperature of the fluid, and a conductivity sensor to measure a conductivity of the fluid. The milk meter may be configured to calibrate the measured flow rate based on each of the measured temperature and the measured conductivity. An integral or an external computing device (or a combination thereof) may be used to provide this functionality. For example, an algorithm may be employed that enables a correction factor to be calculated for the measured flow rate based on a combination of the measured temperature and the measured conductivity.

This combination of measurements can thereby further enhance the calibration or scaling of the flow rate according to the condition or parameters of the fluid or milk.

Optionally the milk meter may comprise a body and a lid or cover. The body may house the various ducts, passages and chambers through which fluid passes through the milk meter. The cover may be mounted to an upper surface of the body to seal or close the ducts, passages, and chambers. The cover may be removable to enable cleaning or maintenance of the milk meter.

The body may further house the flow sensor(s), conductivity sensor(s), and temperature sensor(s) where present. The pressure or vacuum sensor and/or associated sensing chamber (where present) may be mounted to the lid or cover of the milk meter. The pressure or vacuum sensor and/or associated sensing chamber (where present) may be housed within the body of the milk meter and may connect to a wall of a duct of the milk meter. A microcontroller for collecting and/or processing data from the sensors of the milk meter and/or an interface for connecting the milk meter to an external computing device may be located within the body of the milk meter. Interconnects between the sensor and the microcontroller or interface may also be located within the body of the milk meter.

Optionally, the inlet and/or outlet of the milk meter may form or may be connectable to a connector for connecting the milk meter to a milk pipe or milk tube (e.g., a milk pipe connector or a milk tube connector). In this way, the milk meter can be integrated into a milking system or milking machine.

Optionally, the milk meter may include one or more septa, wherein a septum is a wall that forms a division between two passages. A septum may therefore be located at an upstream end of a pair of passages and may divide the passages from each other. A septum of this type may therefore direct fluid into the passages and may contribute to the flow dynamics of the fluid entering the passages. A septum may additionally or alternatively be located at a downstream end of a pair of passages and the passages may recombine past the septum. The septum may therefore direct the fluid flowing from the passages to form a combined flow, and may contribute to the flow dynamics of the fluid exiting the passages. For example, the septum or septa may act to smooth the flow in and/or out of the passages to reduce or avoid the generation of turbulence within the milk meter.

The invention includes the combination of the aspects and preferred features described except where such a combination is clearly impermissible or expressly avoided.

SUMMARY OF THE FIGURES

Embodiments and experiments illustrating the principles of the invention will now be discussed with reference to the accompanying figures in which.

DETAILED DESCRIPTION OF THE INVENTION

Aspects and embodiments of the present invention will now be discussed with reference to the accompanying figures. Further aspects and embodiments will be apparent to those skilled in the art. All documents mentioned in this text are incorporated herein by reference.

Figure 1:
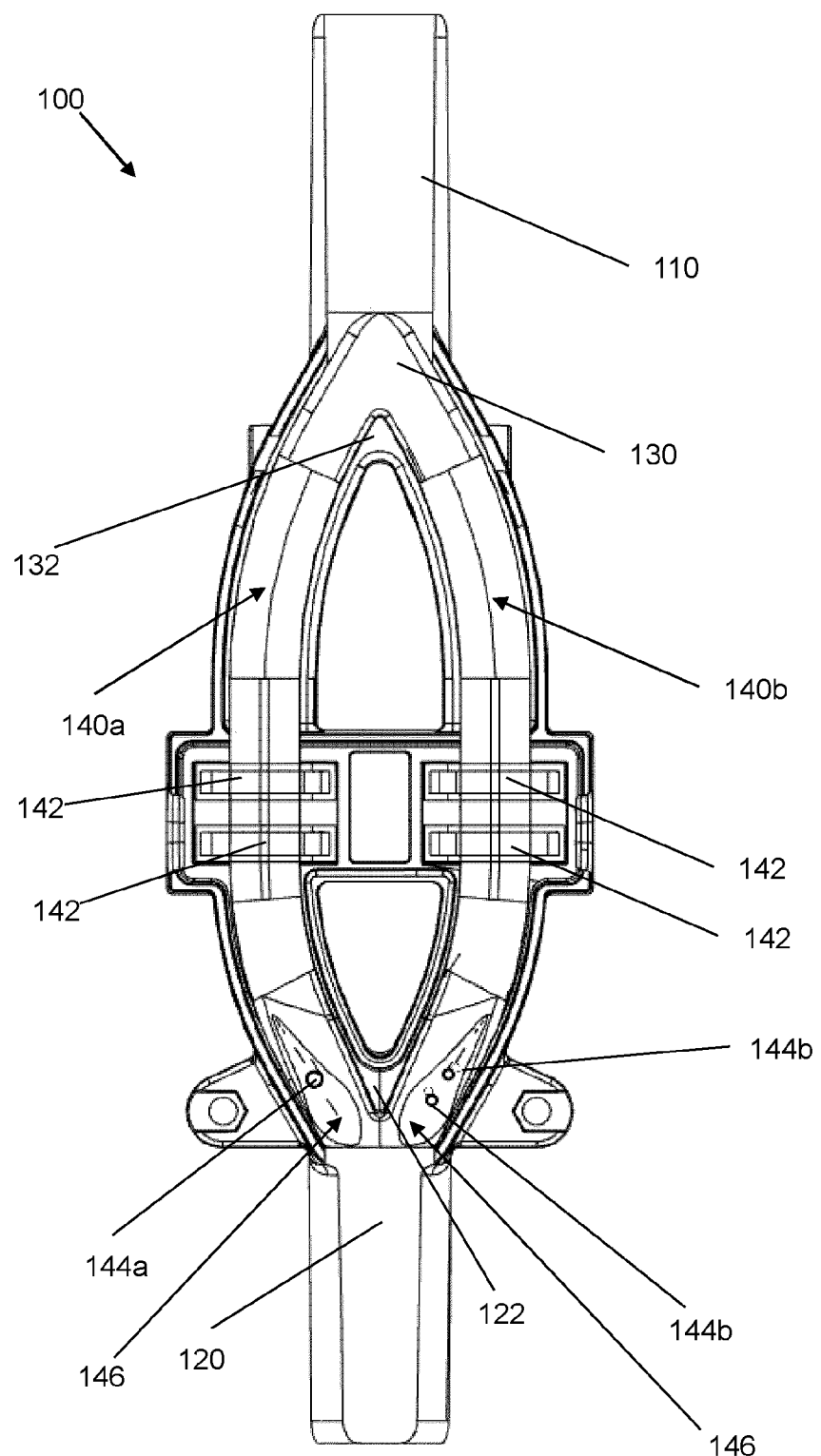
FIG. 1 illustrates a top-down view of a milk meter according to an embodiment of the present invention.
Figure 2:
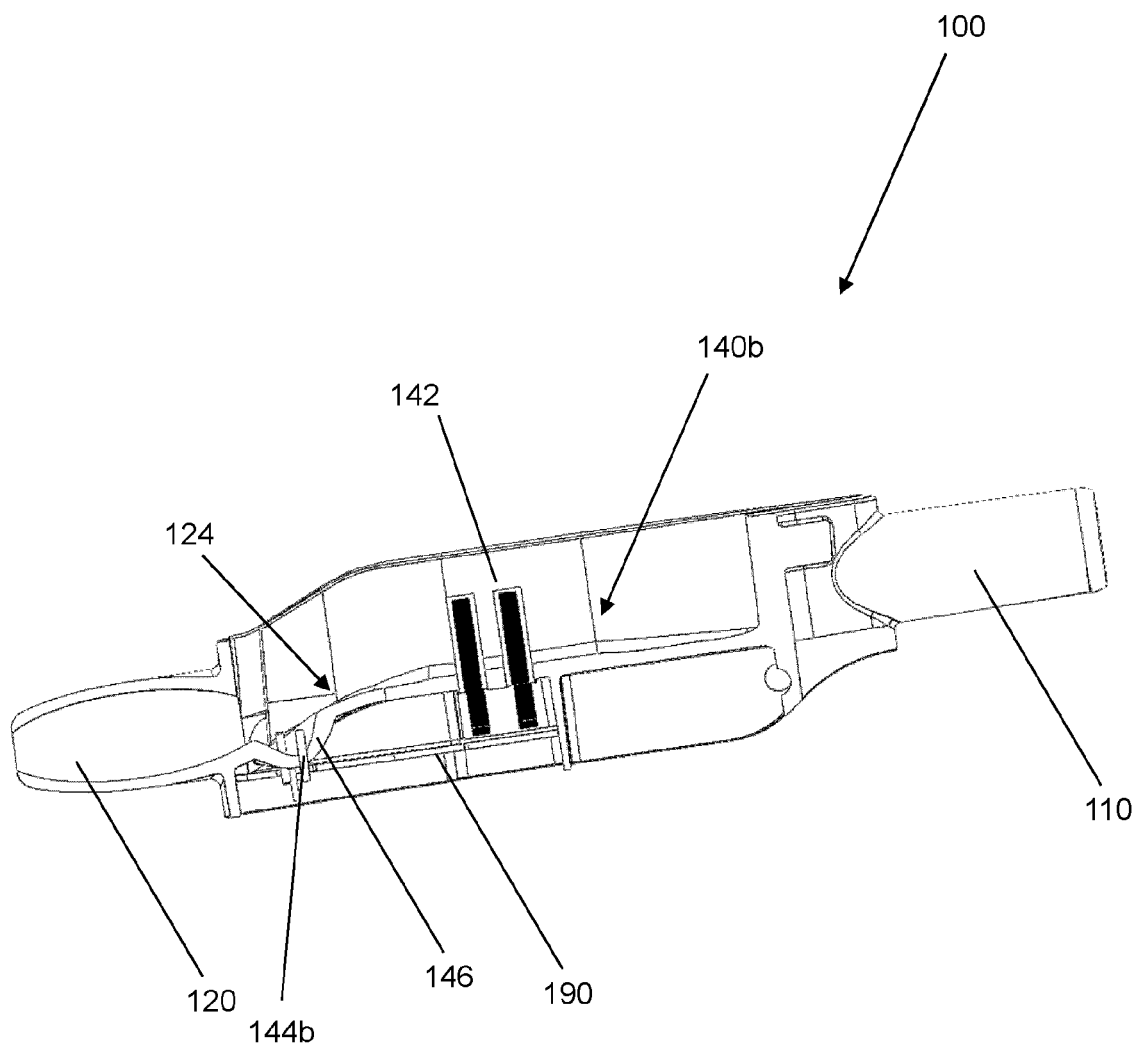
FIG. 2 illustrates a side-on view of the milk meter of FIG. 1.
Figure 3:
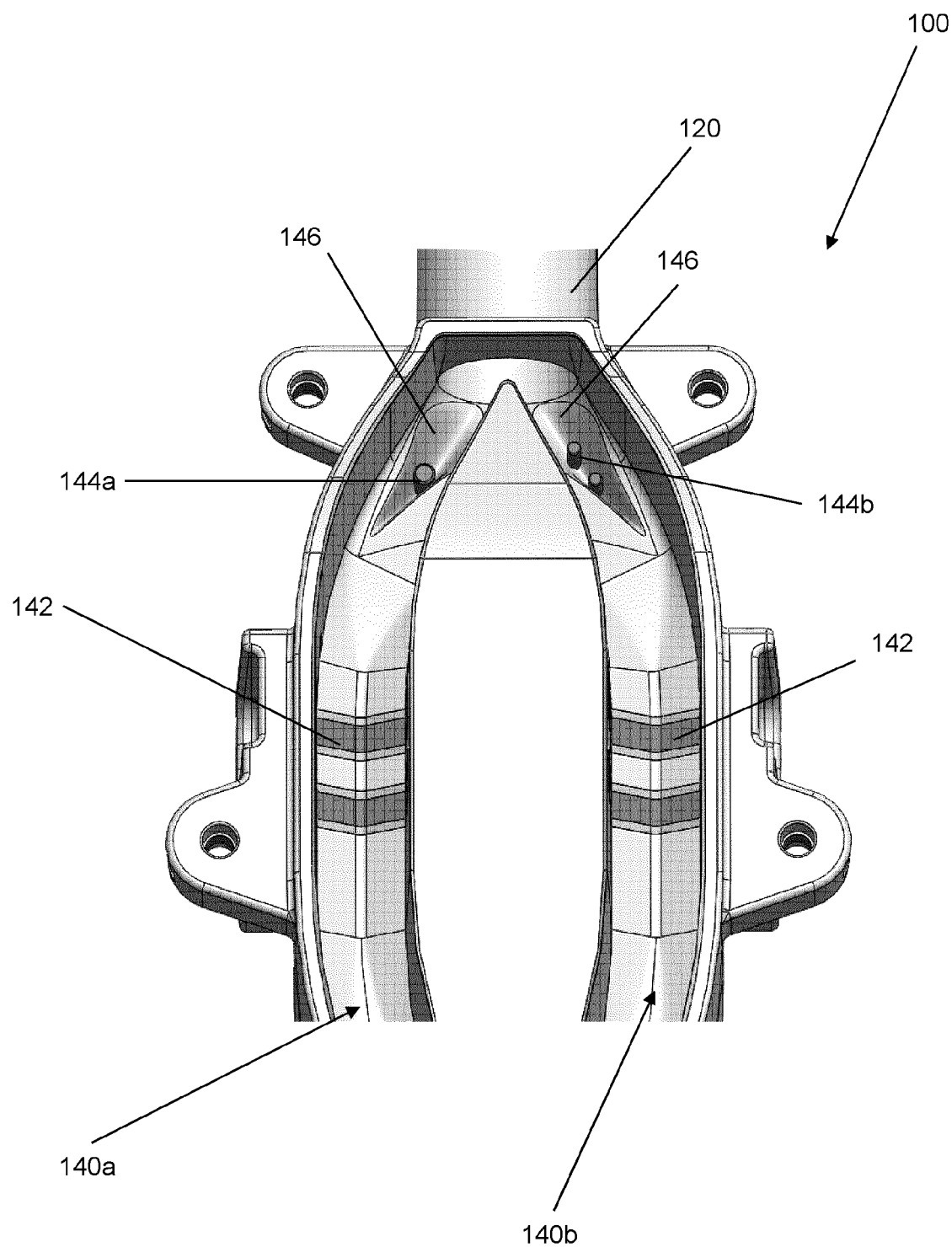
FIG. 3 illustrates a detail of a downstream portion of the milk meter of FIG. 1.

A milk meter 100 according to an embodiment the present invention is illustrated in FIGS. 1, 2 and 3. The milk meter 100 includes an inlet nipple 110 for connecting to an outflow pipe of a milking cluster, and an outlet pipe 120 for connecting to a milk collection reservoir of a milking machine or milking system. Milk flows from the inlet 110 to the outlet 120 via a chamber 130 and a plurality of passages 140a, 140b. The passages 140a, 140b divide from the chamber 130 at an upstream septum 132 and recombine at or upstream of the outlet 120 at a downstream septum 122.

The passages 140a, 140b include flow sensors for measuring a flow rate of fluid (e.g. milk) through the respective passage 140a, 140b. The flow sensors include electrodes 142 which can be used to measure a current through or a resistance of the fluid along the passage 140a, 140b, thereby enabling the instantaneous volume (and hence flow rate) of fluid in the passage 140a, 140b to be determined.

The passages 140a, 140b further include additional sensors, including a temperature sensor 144a and a conductivity sensor 144b. The temperature sensor 144a is for measuring the temperature of the fluid in the passage 140a, 140b. The conductivity sensor 144b includes two probes spaced by a set distance and arranged to be fully immersed in fluid passing through the passage 140a, 140b for measuring the conductivity of the fluid. Other sensor types may also be included as required in the milk meter.

The temperature sensor 144a and conductivity sensor 144b are arranged in stagnation wells 146. A stagnation well 146 is a portion of the passage 140a, 140b wherein the base of the passage includes a concave depression. The geometric shape of the stagnation well 146 and the arrangement within the floor or base of the passage 140a, 140b means that a main fluid flow through the passage 140a, 140b flows above the wells, while a portion of the flow is slowed by the wells 146 to create a semi-static region of fluid that is continuously replaced by the main flow. The stagnation well 146 therefore provides stable conditions for measurement of parameters of the fluid such as temperature and conductivity. A downstream portion of the passages 140a, 140b including the stagnation wells 146 is shown in FIG. 3.

Figure 4:
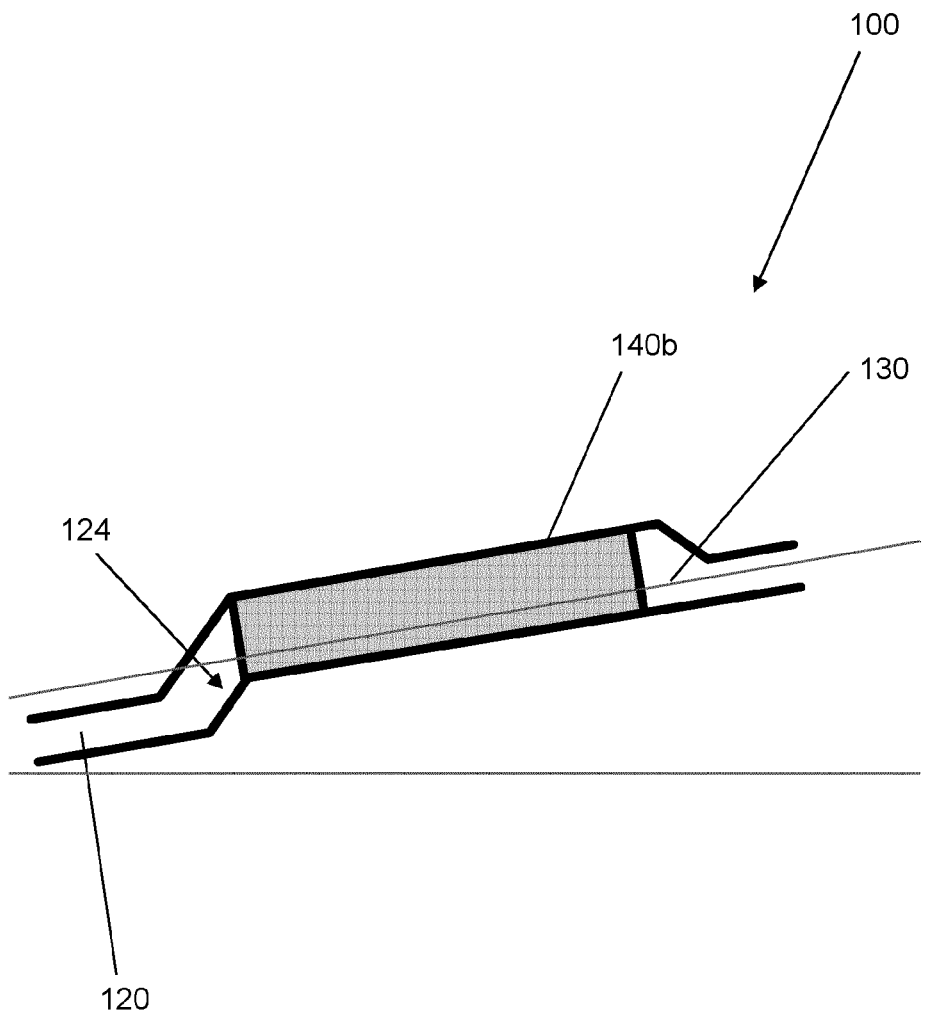
FIG. 4 illustrates a schematic of the milk meter of FIG. 1 and gradient of the passages.

In use, the milk meter 100 is configured to be oriented such that the passage 140a, 140b has a downward gradient. This downward gradient enables the milk meter 100 to empty of fluid once a suction from the milking machine or milking system is ceased. FIG. 4 provides a schematic illustration of this feature.

As can also be seen in FIG. 4, a downstream end of the passage 140a, 140b, or a portion of the outlet 120 forms a downward slope or step 124, being a portion of the passage 140a, 140b or outlet 120 which has an increased or steeper downward gradient with respect to an upstream portion of the passage 140a, 140b. The downward slope or step 124 reduces fluid backflow into and up the milk meter 100 in the case of flow instability in or through the milk meter 100.

Figure 5:
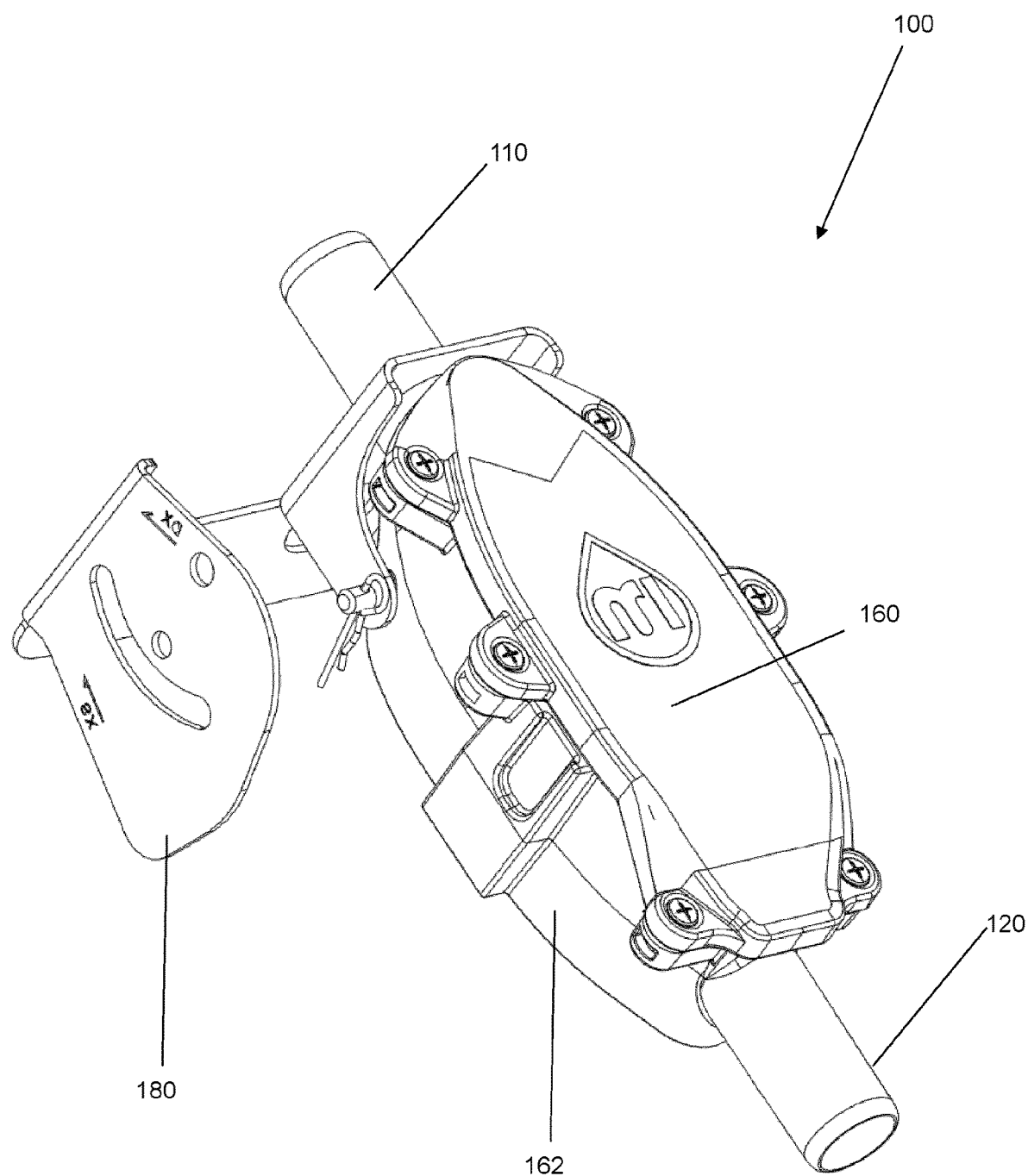
FIG. 5 illustrates the outer housing and mounting bracket of a milk meter according to an embodiment of the present invention.
Figure 6A:
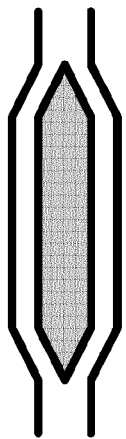
FIG. 6 illustrates exemplary symmetrical arrangements for multiple ducts of a milk meter according to various embodiments.
Figure 6B:
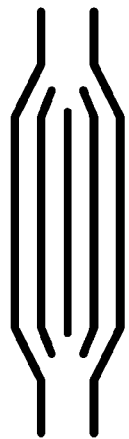
Figure 6C:
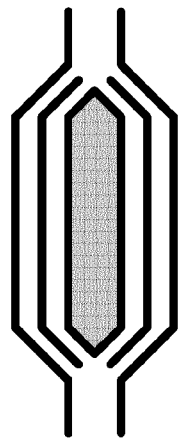
Figure 6D:
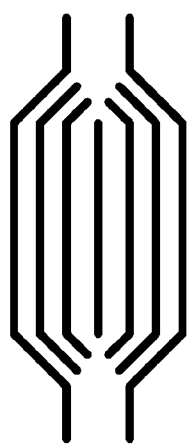
Figure 6E:
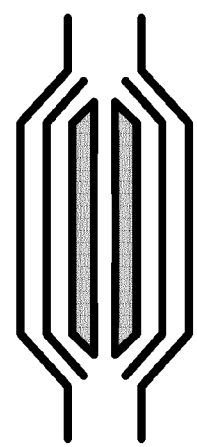
Figure 7A:
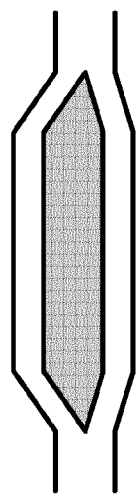
FIG. 7 illustrates exemplary asymmetrical arrangements for multiple ducts of a milk meter according to various embodiments.
Figure 7B:
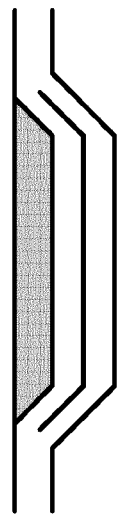
Figure 7C:
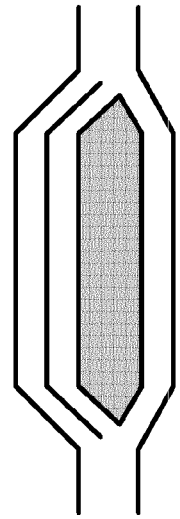
Figure 7D:
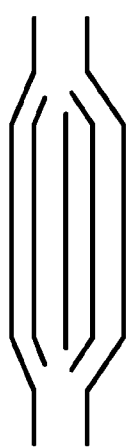
Figure 7E:
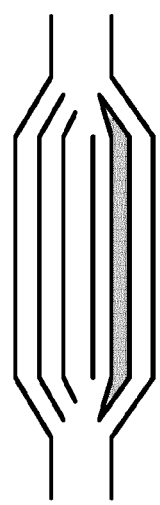

An operating angle for the milk meter 100 may be set by the provision of a mounting bracket 180, by which the milk meter 100 may be mounted to an external surface and angled to have a set gradient. This is illustrated in FIG. 5. FIG. 5 further illustrates the structure of the milk meter 100 including the cover 160 and body 162. The cover 160 of the milk meter 100 may be removable to enable servicing or cleaning of the milk meter 100.

The provision of multiple passages 140a, 140b, each with respective flow sensors provides a more accurate and higher resolution measurement of the total fluid flow rate through the milk meter 100. This can be understood through the following counterexample.

A milk meter structured with a single duct can measure, for the flow through that duct, a flow rate of between 0 l/min and MAX l/min, where MAX is the maximum flow rate that can be measured. This measurement range can be divided into a set number of steps according to the resolution of the flow rate sensor. Meanwhile, a milk meter with N ducts can measure, for each duct, a flow rate of between 0 l/min and MAX/N l/min (assuming flow rate is equal through all ducts). Therefore, assuming the sensor has the same resolution (i.e. same number of steps within the measurement range), then the absolute value of a step (in l/min) is reduced, and the measurement resolution is increased.

Exemplary arrangements of multiple passages within a milk meter are illustrated in FIGS. 6 and 7.

The milk meter 100 having multiple ducts or passages 140a, 140b may calculate or determine the total fluid flow rate based on the combined measurements of the flow sensors in each of the passages 140a, 140b. This calculation may be performed by an integral computing device 3000, an external computing device 3000, or a combination thereof, as discussed further below.

Figure 8:
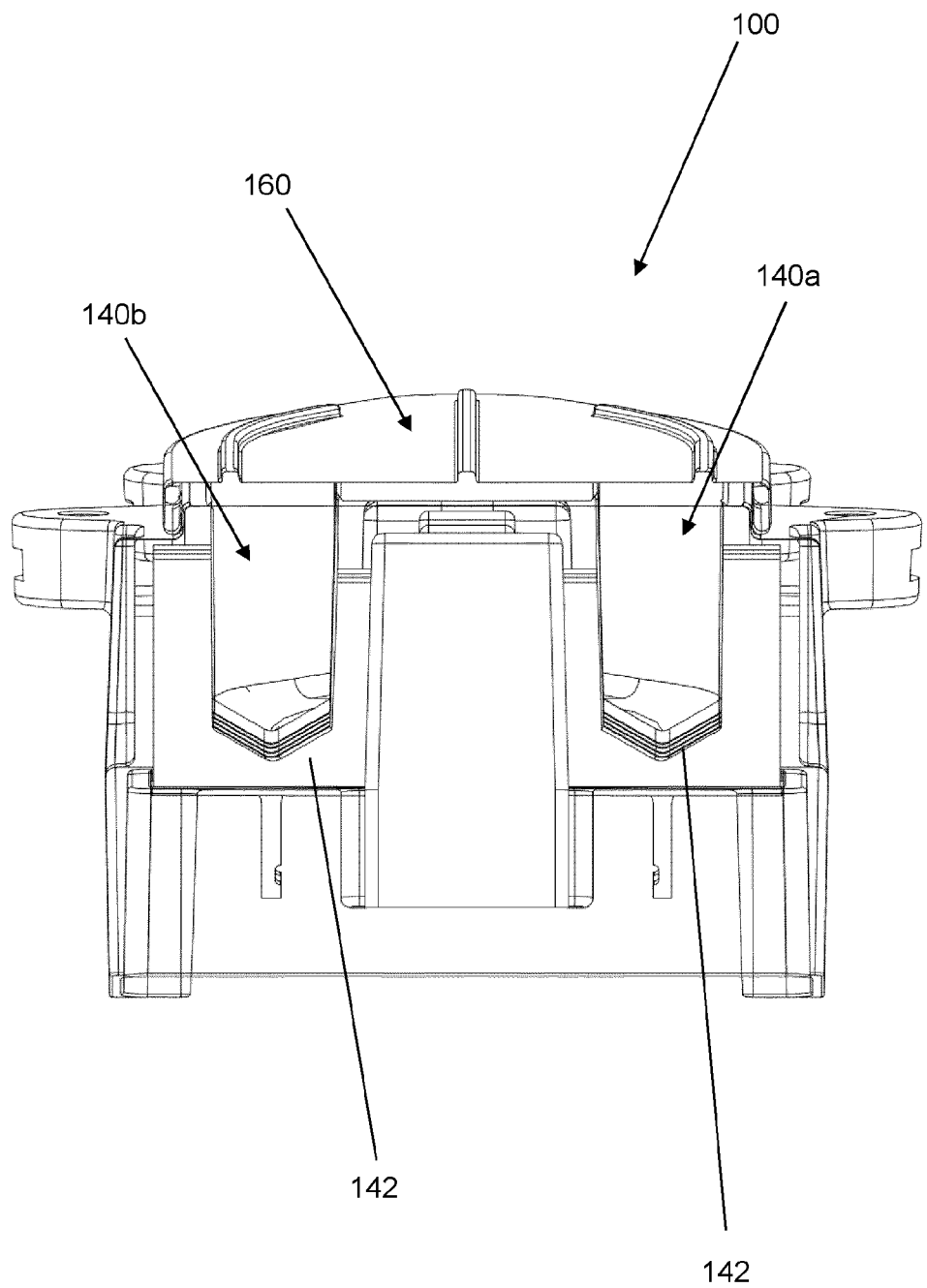
FIG. 8 illustrates a section of the passages, showing a V-shaped region of the base of the passage of the milk meter of FIG. 1.
Figure 9:
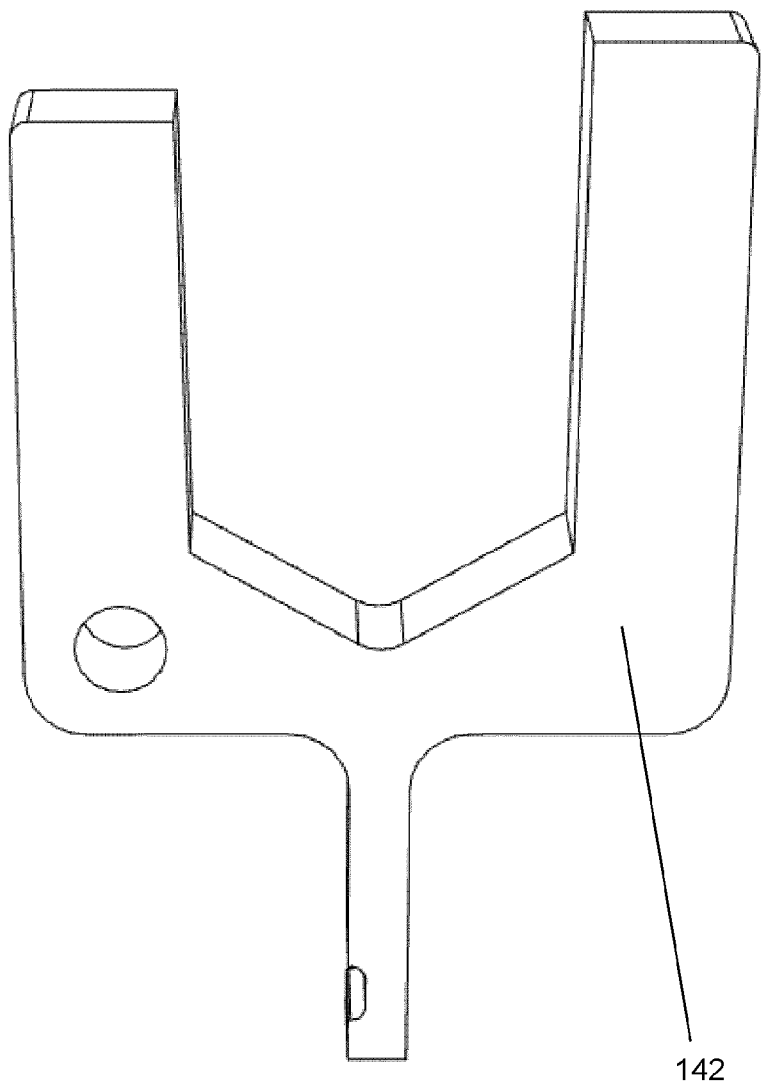
FIG. 9 illustrates a V-shaped measurement electrode for use with the milk meter of FIG. 1.

FIG. 8 illustrates a cut-through image of the milk meter 100, illustrating the presence of a V-shaped region in the passage 140a, 140b. FIG. 8 further illustrates that an upper wall of the passage 140a, 140b is formed by a cover 160. The V-shaped region has a base with a V-shaped cross-section. The electrodes 142 of the flow meter are arranged in this V-shaped region. As illustrated in FIG. 9, the electrodes also have a corresponding V-shape to the base of the passage 140a, 140b.

A purpose of this V-shaped region is to provide improved resolution of measurement at low flow rates. This is because the V-shaped region increases the level of contact between the electrode and the fluid, and, in particular, the change in level of contact between the electrode and the fluid, for low flow rates. In other words, the level of contact does not increase linearly with fluid flow across the whole range of measurement values, but increases more rapidly for a sub-range of lower flow rates.

The passage 140a, 140b includes a transition region upstream of the V-shaped region, which provides a smooth and continuous transition from the shape of the base of the chamber 130 to the V-shaped base. A smooth transition in this way means that the passage 140a does not present any additional obstructions which could otherwise lead to disruption or turbulence of the fluid flow through the passage 140a, 140b.

Figure 10A:
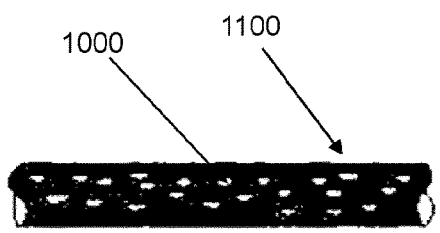
FIG. 10 illustrates bi-phase flow regimes.
Figure 10B:
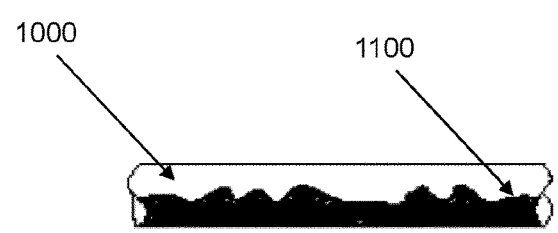
Figure 10C:
Figure 10D:
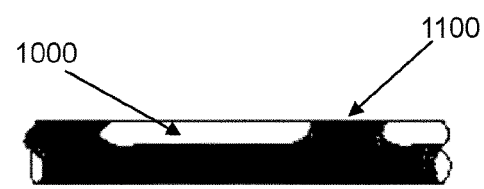
Figure 10E:
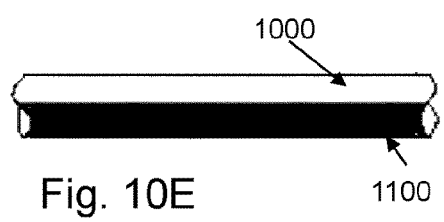
Figure 10F:
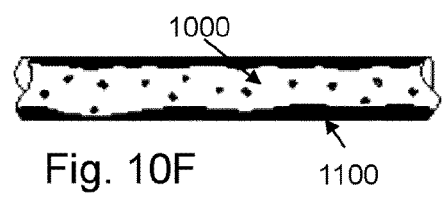

Flow through the passages of a milking machine is typically bi-phase (i.e. a mixture of gas 1000—light shading and liquid 1100—dark shading). Different flow regimes for bi-phase flow are illustrated in FIG. 10, which illustrates bubbly flow with a mixture of small gas bubbles flowing within the liquid (FIG. 10A), wavy flow with separated but unstable gas and liquid (FIG. 10B), plug flow with a mixture of gas bubble sizes flowing within the liquid (FIG. 10C), slug flow with large bubbles flowing in the liquid (FIG. 10D), stratified flow with separate and stable gas and liquid flows (FIG. 10E) and annular flow with gas flow in the centre of the passage and liquid flowing in a film on the passage wall (FIG. 10F).

Of these flow regimes, stratified flow (FIG. 10E) provides a stable regime for measurement of fluid flow rate and fluid properties within a milk meter. Milk meter 100 is operable to generate stratified flow of fluid within a stratified flow region in each of the one or more ducts to provide this increased measurement stability (and hence accuracy). This improvement applies to both the flow rate measurement (via electrodes 142), and the fluid property measurement (temperature, conductivity) via additional sensors 144a, 144b.

Figure 11:
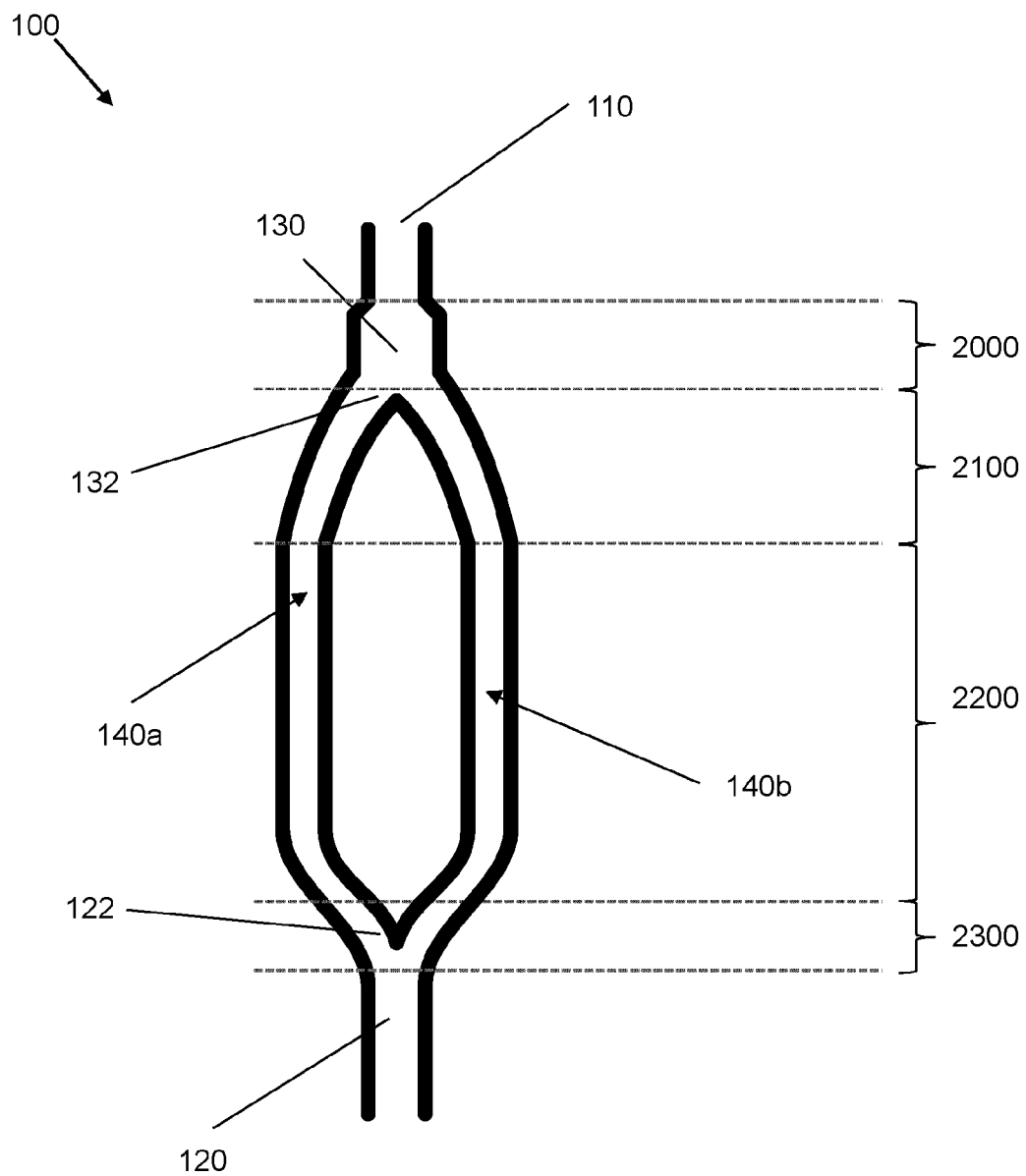
FIG. 11 illustrates a schematic of flow regions within a milk meter according to an embodiment of the present invention.

A schematic image of the milk meter 100 and the arrangement of the inlet 110, chamber 130, and passages 140 that enable the generation of stratified flow within the milk meter 100 is illustrated in FIG. 11. Stratified flow generation may further be dependent on the orientation of the milk meter 100 in use, in that a shallow gradient is preferable for slowing the fluid as it passes through the milk meter 100 (see FIGS. 2 and 4) to enhance flow stratification via the flow path geometry. The areas and the transitions between them should preferably be smooth (i.e. without sharp changes in direction of the passage walls) to reduce turbulence generation within the milk meter 100. The areas identified in the following are connected one to each other in a harmonious way so that there are no abrupt geometrical variations encountered by the fluid moving through them. The transition between one area and the subsequent is illustrative rather than being a clearly defined boundary, and some of these areas may overlap each other.

Fluid enters the milk meter 100 via inlet 110 and passes into chamber 130. This chamber 130 forms the first fluid flow region 2000 of the milk meter 100. The chamber 130 has a larger cross-sectional area than the inlet 110. This slows and expands the fluid entering the chamber 130, reducing turbulence in the flow. Furthermore, the chamber 130 provides a gas pocket which can attenuate variations in the milk flow rate due to changes in a suction or vacuum level provided by the milking system with which the milk meter 100 is used.

A downstream end of the chamber 130 includes a septum 132 or septa that divide the fluid into the passages 140a, 140b. The passages 140a, 140b have a total cross-sectional area (i.e. the sum of the cross-sectional areas of each of the passages 140a, 140b) that is greater than that of the inlet 110, but less than that of the chamber 130 (i.e. intermediate to the two values). This entry portion of the passages 140a, 140b forms second flow region 2100 of the milk meter 100. Providing passages 140a, 140b with a total cross-sectional area less than that of the chamber 130 compacts the fluid as it leaves the chamber 130, reducing the presence or production of foam within the fluid. Providing passages 140a, 140b with a total cross-sectional area greater than that of the inlet 110 reduces the overall restriction of fluid flow that may be caused by the milk meter 100. As fluid passes through second flow region 2100, the fluid settles on a bottom surface of the passage 140a, 140b to flow in a stratified flow regime. The second flow region 2100 of the passage 140a, 140b is of sufficient length that the fluid is stratified within this flow region.

Fluid entering the third flow region 2200 is therefore stratified (flowing in stratified flow regime) and remains so through the fourth flow region 2300 as the fluid recombines and flows to the outlet 120 of the milk meter 100. Flow sensors 142 and additional sensors 144a, 144b are located within the third or fourth flow region to be positioned within a stable flow portion. Stagnation wells 146 and downward step or slope 124 may also be located with the third 2200 or fourth 2300 flow region.

The passages 140*a*, 140*b* recombine within the fourth flow region 2300 at downstream septum 122. The downstream septum 122 may act as a baffle to guide the fluid from the passages 140*a*, 140*b* to the outlet without disrupting the flow, and may, along with the downward step or slope 124, further reduce instabilities from propagating upstream from the outlet 120 into the passages 140*a*, 140*b*.

While the above is illustrated in a milk meter 100 with two passages, a similar principle (i.e. sequence of geometric configurations and selection of appropriate passage lengths) can be used to enable stratified flow in a milk meter with a single passage and/or a milk meter with more than two passages.

The milk meter 100 further comprises a vacuum sensor 170 or pressure sensor. A function of the vacuum sensor is to measure and/or monitor the pressure within the milk meter 100. This can enable, for example, detection of slippage of the milk cluster (which would present as excess air or reduced vacuum within the milk meter) or excess vacuum, so as to enable improved animal comfort.

Figure 12A:
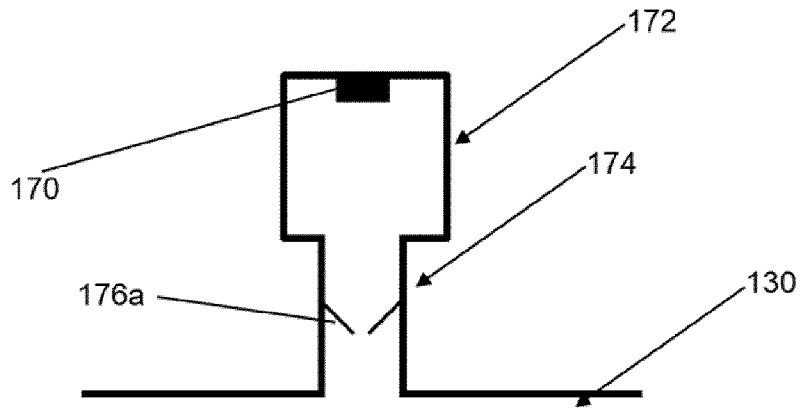
FIG. 12 illustrates arrangements for a vacuum or pressure sensor in a milk meter according to an embodiment of the present invention.
Figure 12B:
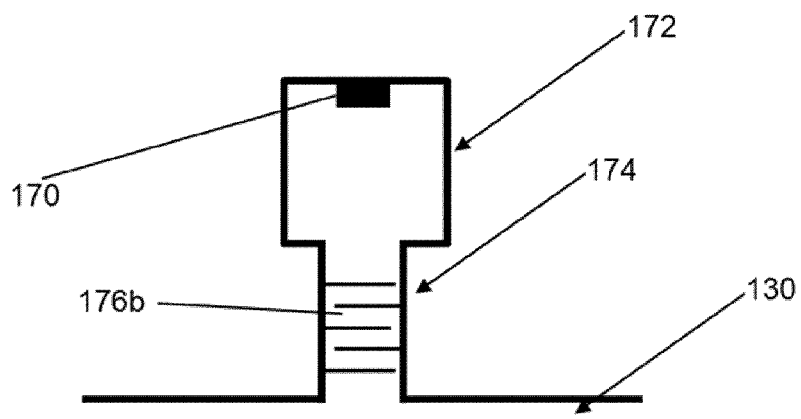
Figure 12C:
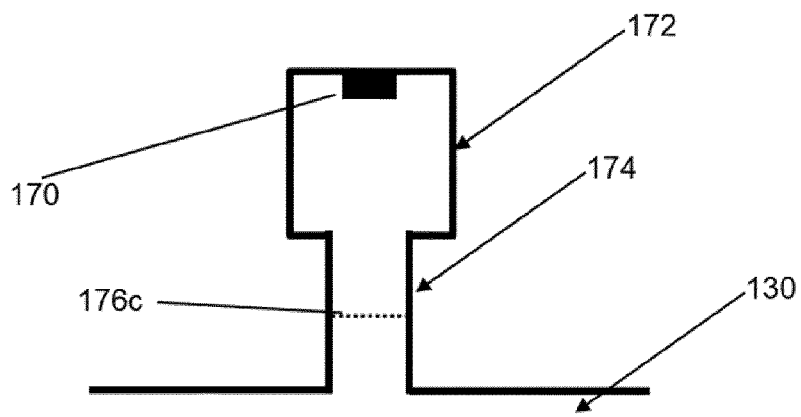

The vacuum sensor 170 may be located, for example, within the cover 160 or lid of the milk meter 100 and extend into the chamber 130 or passages 140*a*, 140*b*. The vacuum sensor 170 may be located within the body 162 of the milk meter 100 and may connect to a wall of the passages 140*a*, 140*b*. Alternatively, a pressure sensing chamber 172 may be provided in fluid communication with the chamber 130 or passages 140*a*, 140*b* via a pressure sensing passage 174, and the vacuum sensor may be located within this pressure sensing chamber 172. The pressure sensing chamber 172 may be located within the cover 160 or within the body 162 of the milk meter. An advantage of these latter configurations is that the pressure sensor 170 can be isolated from the fluid flowing through the milk meter 100 (which might otherwise affect the measurement or damage the vacuum sensor 170) via the inclusion of a shield, e.g., a barrier 176*a*, baffles 176*b*, or semipermeable membrane 176*c* within the pressure sensing passage 174 as illustrated in FIG. 12. Other arrangements of shields are also possible that provide this same functionality.

A barrier 176*a* may be, for example, a wall which blocks or narrows the passage 174 to reduce the passage of fluid to the chamber 172. A shield 176*b* may be a plurality of walls (or baffles) arranged to create a tortuous path within the passage 174 to reduce the passage of fluid to the chamber 172. A semipermeable membrane 176*c* may be a porous membrane arranged to span the passage 174 to reduce the passage of fluid to the chamber 172.

The milk meter 100 may comprise a computing device 3000 and/or may be operable to communicate with an external computing device 3000. The computing device 3000 may, for example, process the data from one or more flow sensors to calculate a combined flow rate. The computing device 3000 may also scale or calibrate the data from the sensors to account for device operating conditions. The computing device 3000 may process data in real time, and/or may store data for later processing. An integral and an external computing device may operate in cooperation to provide the processing or calculating functionality.

Figure 13:
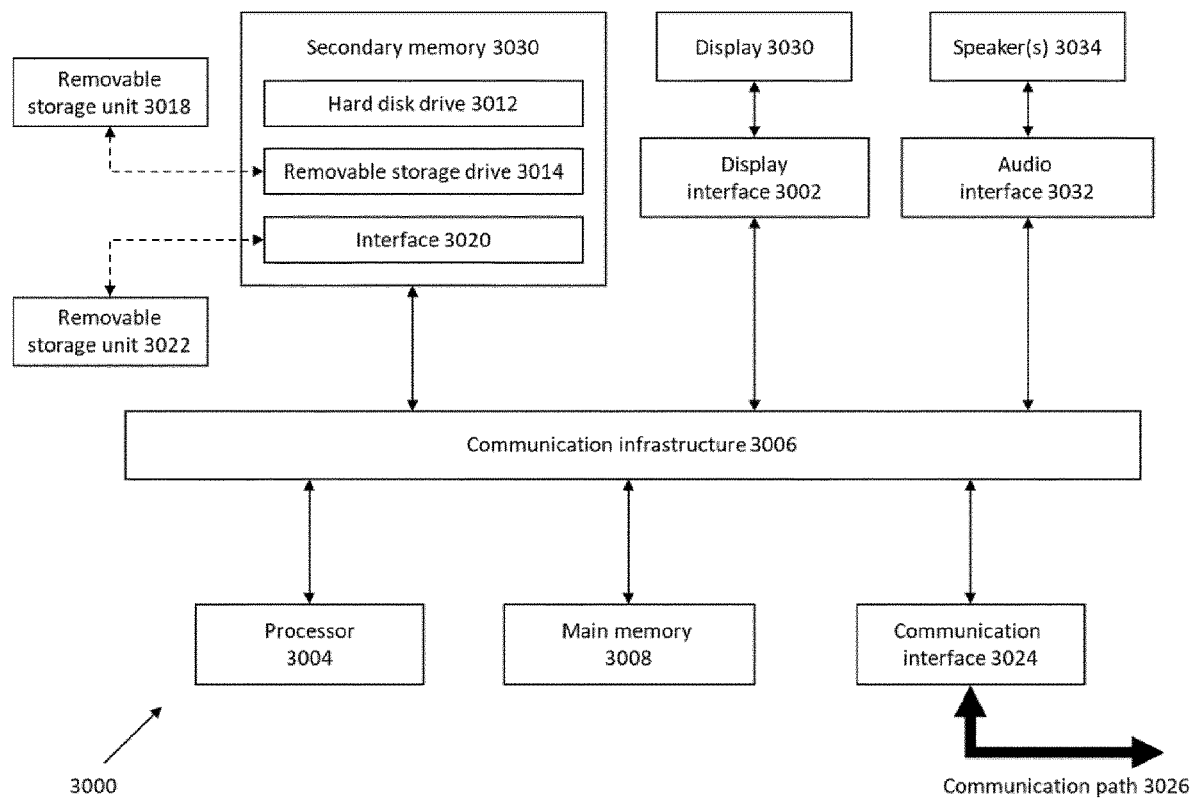
FIG. 13 illustrates an exemplary computing device for use with a milk meter according to an embodiment of the present invention.

An integral computing device or external computing device may be a microcontroller 190 having specific functionality for controlling and/or collecting or processing data from one or more milk meters 100. For example, a PCB or microcontroller 190 may be included in the milk meter 100 (see, for example, FIG. 2). An external computing device 3000 may be a generic computing device which implements the functionality wholly or partially via software. An exemplary computer device 3000 is illustrated in FIG. 13.

The example computing system 3000 includes a processor 3004 for executing software routines. Although a single processor is shown for the sake of clarity, the computing system 3000 may also include a multi-processor system. The processor 3004 is connected to a communication infrastructure 3006 for communication with other components of the computing system 3000. The communication infrastructure 3006 may include, for example, a communications bus, cross-bar, or network.

The computing system 3000 further includes a main memory 3008, such as a random-access memory (RAM), and a secondary memory 3010. The secondary memory 3010 may include, for example, a hard disk drive 3012 and/or a removable storage drive 3014, which may include a floppy disk drive, a magnetic tape drive, an optical disk drive, solid state storage or the like. The removable storage drive 3014 reads from and/or writes to a removable storage unit 3018 in a well-known manner. The removable storage unit 3018 may include a floppy disk, magnetic tape, optical disk, removable solid-state storage (e.g. SD card) or the like, which is read by and written to by removable storage drive 3014. As will be appreciated by persons skilled in the relevant art(s), the removable storage unit 3018 includes a computer readable storage medium having stored therein computer executable program code instructions and/or data.

In an alternative implementation, the secondary memory 3010 may additionally or alternatively include other similar means for allowing computer programs or other instructions to be loaded into the computing system 3000. Such means can include, for example, a removable storage unit 3022 and an interface 3020. Examples of a removable storage unit 3022 and interface 3020 include a program cartridge and cartridge interface (such as that found in video game console devices), a removable memory chip (such as an EPROM or PROM) and associated socket, and other removable storage units 3022 and interfaces 3020 which allow software and data to be transferred from the removable storage unit 3022 to the computer system 3000.

The computing system 3000 also includes at least one communication interface 3024. The communication interface 3024 allows software and data to be transferred between computing system 3000 and external devices via a communication path 3026. In various embodiments, the communication interface 3024 permits data to be transferred between the computing system 3000 and a data communication network, such as a public data or private data communication network. The communication interface 3024 may be used to exchange data between a plurality of different computing systems 3000 that together form an interconnected computer network. Examples of a communication interface 3024 can include a modem, a network interface (such as an Ethernet card), a communication port, an antenna with associated circuitry and the like. The communication interface 3024 may be wired or may be wireless. Software and data transferred via the communication interface 3024 are in the form of signals which can be electronic, electromagnetic, optical, or other signals capable of being received by communication interface 3024. These signals are provided to the communication interface via the communication path 3026.

As shown in FIG. 13, the computing system 3000 further includes a display interface 3002 which performs operations for rendering images to an associated display 3030 and an audio interface 3032 for performing operations for playing audio content via associated speaker(s) 3034.

As used herein, the term "computer program product" may refer, in part, to removable storage unit 3018, removable storage unit 3022, a hard disk installed in hard disk drive 3012, or a carrier wave carrying software over communication path 3026 (wireless link or cable) to communication interface 3024. A computer readable medium can include magnetic media, optical media, or other recordable media, or media that transmits a carrier wave or other signal. These computer program products are devices for providing software to the computing system 3000.

The computer programs (also called computer program code) are stored in main memory 3008 and/or secondary memory 3010. Computer programs can also be received via the communication interface 3024. Such computer programs, when executed, enable the computing system 3000 to perform one or more features of embodiments discussed herein. In various embodiments, the computer programs, when executed, enable the processor 3004 to perform features of the above-described embodiments. Accordingly, such computer programs represent controllers of the computer system 3000.

Software may be stored in a computer program product and loaded into the computing system 3000 using the removable storage drive 3014, the hard disk drive 3012, or the interface 3020. Alternatively, the computer program product may be downloaded to the computer system 3000 over the communications path 3026. The software, when executed by the processor 3004, causes the computing system 3000 to perform functions of embodiments described herein.

It is to be understood that the embodiment of FIG. 13 is presented merely by way of example. Therefore, in some embodiments one or more features of the computing system 3000 may be omitted. Also, in some embodiments, one or more features of the computing system 3000 may be combined together. Additionally, in some embodiments, one or more features of the computing system 3000 may be split into one or more component parts.

It will be appreciated that the elements illustrated in FIG. 13 function to provide means for performing the various functions and operations of the milk meter 100 as described in the above embodiments.

Measurement of fluid flow rate through the milk meter 100 may be affected by parameters of the fluid such as its conductivity and/or temperature. For example, since fluid flow can be measured by electrodes 142 according to the fluid resistance, a change in the conductivity may affect the measurement. Meanwhile, changes in the fluid temperature may affect the density, which can further affect the measurement. To account for this, the integral or external computing device 3000 may implement a scaling or calibration algorithm to adjust the measured flow rate according to input from additional sensors, such as the temperature sensor 144a or conductivity sensor 144b. Implementation of the algorithm can thereby adjust or correct for changes in the operating condition of the milk meter 100 and properties of the measured fluid to provide improved measurement accuracy. An exemplary flow chart for a scaling or calibration algorithm is illustrated in FIG. 14.

Figure 14:
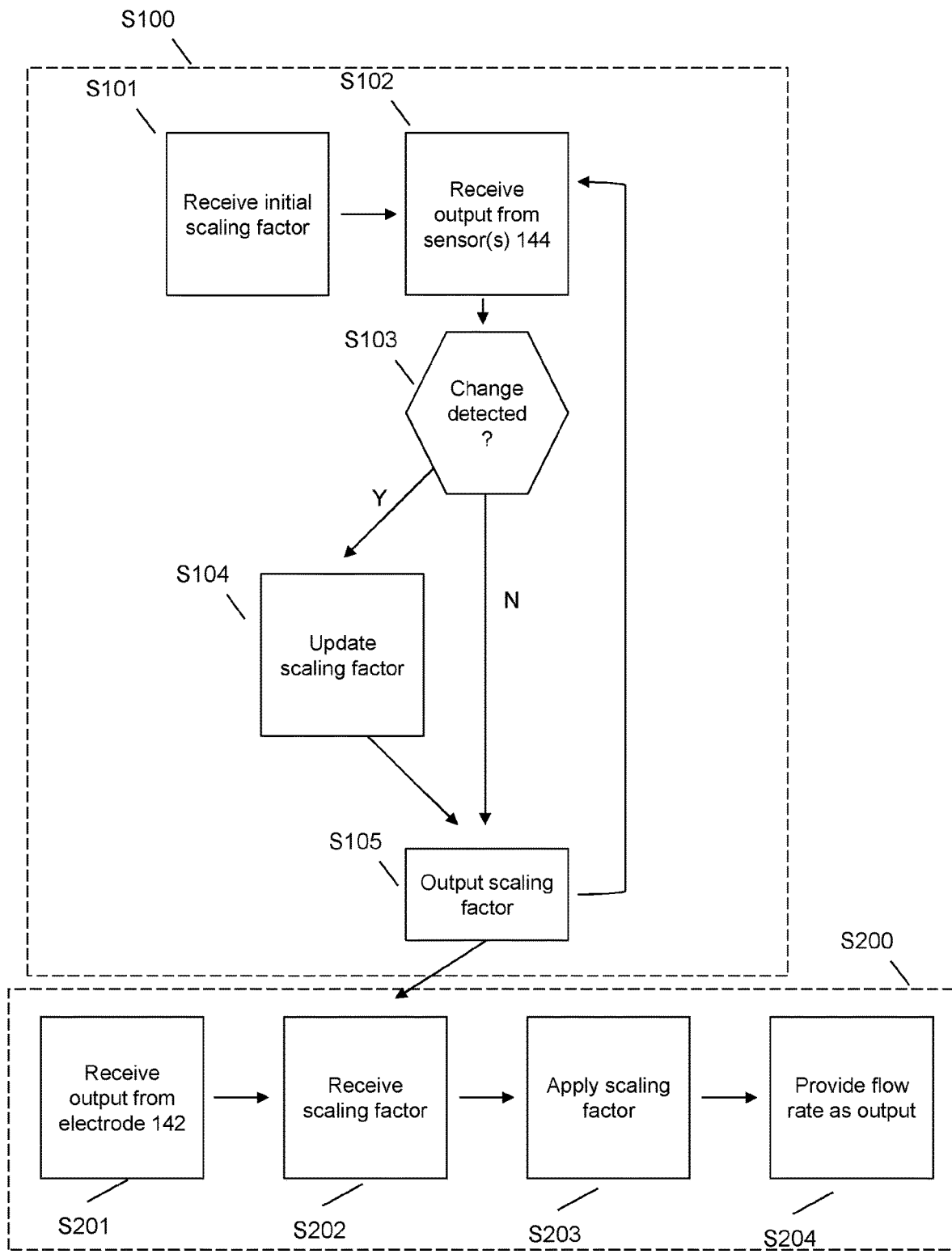
FIG. 14 illustrates a calibration algorithm for a milk meter according to an embodiment of the present invention.

The process illustrated in FIG. 14 consists of two related sequences. The first sequence S100 sets and updates the scaling factor. The second sequence S200 determines a flow rate based on the scaling factor output from the first sequence S100. The flow rate can further be converted to a production volume by integrating the flow rate with respect to time, and to a production weight or mass by multiplying the volume by a specific density of the fluid.

In the first sequence S100, the computing device first sets or retrieves from storage a default or starting value for the scaling factor (S101). This step might be performed only when the milk meter 100 is first used, or for each time the milk meter 100 is used (for example for each milking session). The computing device next receives outputs from sensors which may include a temperature sensor 144a or conductivity sensor 144b (S102). It is next determined whether the value from the sensor has changed by more than a threshold amount, such that an update is needed for the scaling factor (S103). If a change is needed, the computing device proceeds to S104 and updates the scaling factor. If no change is needed, the computing device proceeds directly to S105. At S105, the process terminates, and the scaling factor is output. Sequence S100 is repeated as required, for example at a set time interval.

In the second sequence S200, the computing device receives an output from the flow rate sensing electrodes 142 (S201). The latest scaling factor is checked or retrieved (S202). A check may be made for an updated scaling factor at a set time period, or the retrieved scaling factor may be automatically updated when first sequence S100 leads to a change in the scaling factor. The scaling factor is applied to the output of the flow rate sensing electrodes 142 (S203), and the scaled flow rate for that measurement iteration is output (S204). The application of the scaling factor therefore enables the measured flow rate to be calibrated to account for changing fluid conditions within the milk meter 100.

The output of the vacuum sensor 170 may also be provided to the scaling or calibration algorithm, and may further enhance the accuracy of the flow sensor measurement by accounting for the pressure in the milk meter 100.

Figure 15:
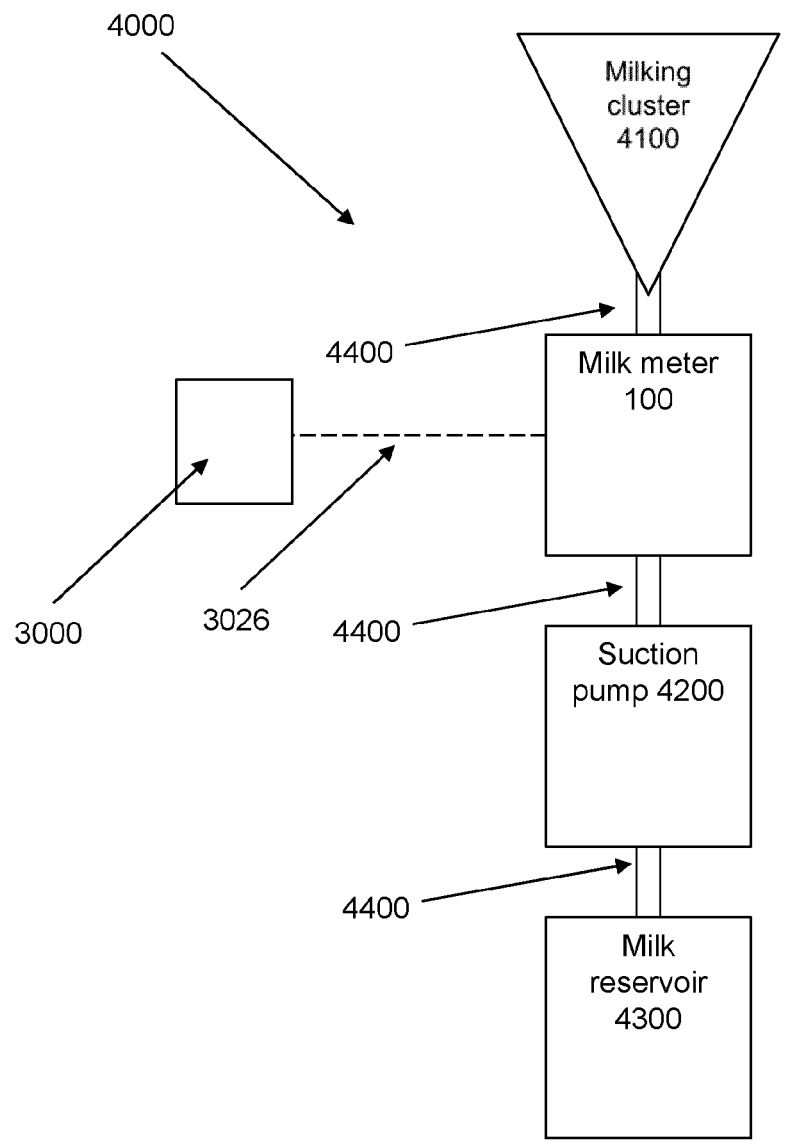
FIG. 15 illustrates a milking machine for use with the milk meter according to an embodiment of the present invention.

One or more milk meters 100 according to the present invention may be used or installed within a milking machine or milking system, as may be found in a milking parlour. An example arrangement of a milking machine 4000 for use with a milk meter 100 according to the present invention is shown in FIG. 15.

The milking machine includes a milking cluster 4100 for connection to the teat of the animal, a suction pump 4200 for drawing milk from the animal, and a milk reservoir 4300 for collecting the milk from the animal. The components are connected via a milk pipe or milk tube 4400, with the milk meter 100 being arranged along the milk pipe 4400 to measure the flow rate through the milk pipe 4400. The milk meter 100 is connected to an external computing device 3000 via communication path 3026. In other arrangements, the computing device may be integral to the milk meter 100.

Figure 16:
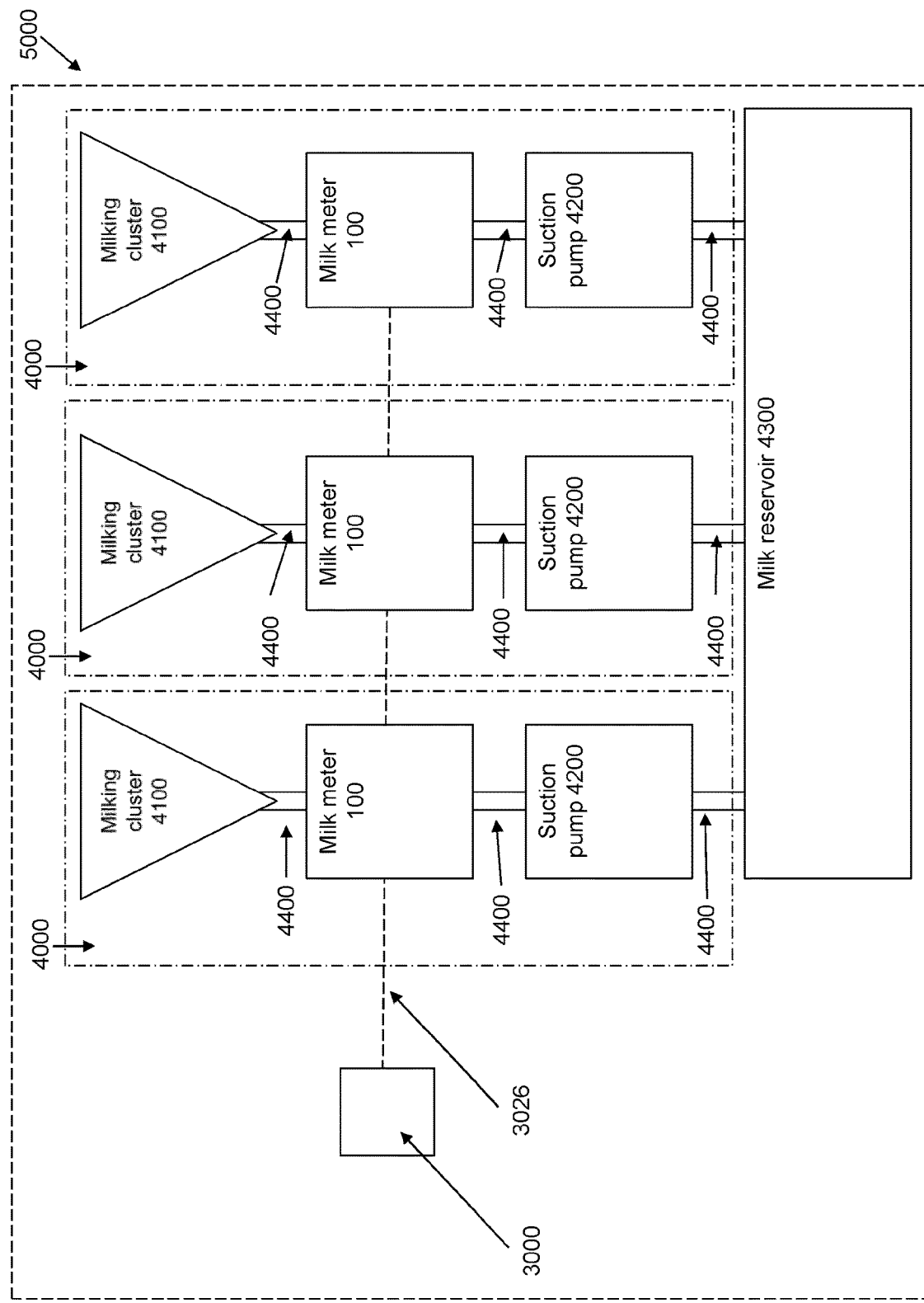
FIG. 16 illustrates a milking parlour including a milk meter according to an embodiment of the present invention.

An example arrangement of a milking parlour 5000 including a plurality of milking machines and milk meters 100 according to the present invention is shown in FIG. 16. In this case, the milk reservoir 4300 may be shared between multiple milking machines 4000 rather than forming part of a single machine.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

The invention claimed is:

1. A milk meter (100) for measuring milk flow in a milking machine, comprising:
an inlet (110) for receiving fluid, the inlet (110) having a first cross-sectional area;
a chamber (130) downstream of the inlet (110) for receiving fluid from the inlet (110), the chamber having a second cross-sectional area greater than the first cross-sectional area;
a plurality of ducts (140) extending downstream from the chamber (130) for receiving fluid from the chamber (130), the ducts forming a plurality of flow paths through the milk meter (100), the ducts (140) having a combined cross-sectional area greater than the first cross-sectional area and less than the second cross-sectional area;
the first, second, and combined cross-sectional areas being selected such that when the inlet receives a non-stratified bi-phase flow of fluid, the milk meter (100) is configured to generate stratified flow of fluid within a stratified flow region in each of the plurality of ducts (140); and
a plurality of flow sensors (142) positioned within the plurality of flow paths, each flow sensor (142) being operable to measure a flow rate of fluid through its respective flow path.

2. The milk meter (100) according to claim 1, wherein the milk meter (100) is configured to determine a measured total flow rate of fluid through the milk meter (100) using the measured flow rates from the plurality of flow sensors (142).

3. The milk meter (100) according to claim 1, wherein the milk meter (100) comprises an outlet (120) for releasing fluid from the milk meter (100), and wherein the plurality of ducts (140) combine upstream of the outlet (120).

4. The milk meter (100) according to claim 1, wherein the plurality of flow sensors (142) comprises a separate flow sensor (142) positioned within each of the ducts (140), each flow sensor (142) being operable to measure a flow rate of fluid through its respective duct (140).

5. The milk meter (100) according to claim 4, wherein each flow sensor (142) of the plurality of flow sensors (142) is positioned within the stratified flow region of its respective duct (140).

6. The milk meter (100) according to claim 1, wherein a cross-sectional area of at least one duct (140) is smaller than the first cross-sectional area.

7. The milk meter (100) according to claim 4, wherein each duct (140) of the plurality of ducts (140) comprises a downward ramp or step arranged downstream of the respective flow sensor (142) to reduce fluid backflow through the respective flow sensor (142).

8. The milk meter (100) according to claim 7, wherein each duct (140) comprises
a first portion and a second portion downstream of the first portion; wherein
the respective flow sensor (142) is positioned within the first portion of the duct (140); and wherein, in use,
the first portion of the duct (140) forms a first downward gradient, and the second portion of the duct (140) forms a second downward gradient, the second downward gradient being steeper than the first downward gradient to form the downward ramp or step.

9. The milk meter (100) according to claim 8, wherein the first downward gradient is between 5° and 25° from horizontal, preferably between 10° and 20°, more preferably 15°.

10. The milk meter (100) according to claim 1, further comprising
a conductivity sensor (144b) arranged to measure a conductivity of the fluid;
wherein each of the flow sensors (142) is arranged to measure a resistance between two points along the respective flow path to measure a flow rate of the fluid through the flow path, and
wherein the milk meter (100) is configured to calibrate the measured flow rate from the flow sensors (142) based on the measured conductivity.

11. The milk meter according to claim 10, wherein:
each of the flow sensors (142) comprises a pair of electrodes arranged to measure a resistance between two points along a duct (140) of the plurality of ducts (140).

12. The milk meter (100) according to claim 10, further comprising a pressure sensor (170) to measure an air pressure within the milk meter (100), wherein the milk meter (100) is configured to calibrate the measured flow rate from the flow sensors (142) based on the measured conductivity and on the measured air pressure.

13. The milk meter (100) according to claim 1, comprising:
a pressure sensor (170) to measure an air pressure within the milk meter (100).

14. The milk meter (100) according to claim 13, wherein the pressure sensor (170) is arranged to measure the air pressure within at least one duct (140) of the plurality of ducts (140).

15. The milk meter (100) according to claim 13, wherein the pressure sensor (170) is arranged to measure the air pressure in a pressure sensing chamber (172) fluidly connected to at least one duct (140) of the plurality of ducts (140), the pressure sensing chamber (172) being isolated from the duct (140) by a shield.

16. The milk meter (100) according to claim 1 comprising a V-shaped region in each duct (140), wherein the V-shaped region has a base with a V-shaped cross-section.

17. The milk meter (100) according to claim 16, further comprising a transition region arranged upstream of the V-shaped region, wherein a base portion of the transition region transitions from a rounded cross-section to the V-shaped cross-section along a length of the transition region.

18. The milk meter (100) according to claim 16, wherein:
each flow sensor (142) comprises a plurality of electrodes arranged within the V-shaped region of the respective duct (140) to measure a resistance between two points along the duct (140); and wherein
the electrodes have a V-shaped cross-section commensurate with the V-shaped cross-section of a base portion of the V-shaped region.

19. The milk meter (100) according to claim 1, wherein:
the milk meter (100) comprises a stagnation well (146) to generate a region of stagnated fluid; and
one or more sensors (144) located to measure a characteristic of the stagnated fluid within the stagnation well (146).

20. The milk meter (100) according to claim 19, wherein:
the stagnation well (146) comprises a concave depression formed in a base of a duct (140) of the plurality of ducts (140) of the milk meter (100).

21. The milk meter (100) according to claim 19, wherein the one or more sensors (144) include at least one of a temperature sensor (144*a*) and a conductivity sensor (144*b*).

22. The milk meter (100) according to claim 19, wherein the one or more sensors (144) includes a temperature sensor (144*a*) to measure a temperature of the fluid, and wherein the milk meter (100) is configured to calibrate the measured flow rate based on the measured temperature.

23. The milk meter (100) according to claim 22, wherein the one or more sensors (144) includes a conductivity sensor (144*b*) to measure a conductivity of the fluid and wherein the milk meter (100) is configured to calibrate the measured flow rate based on the measured temperature and the measured conductivity.

* * * * *